3,326,705
METHOD OF REDUCING CLAY VISCOSITY
James B. Duke, Metuchen, N.J., assignor to Minerals & Chemicals Philipp Corporation, Woodbridge, N.J., a corporation of Maryland
No Drawing. Filed Dec. 1, 1965, Ser. No. 510,970
10 Claims. (Cl. 106—72)

This invention relates to a method for treating kaolin clay for the purpose of improving rheological properties of aqueous slips of the clay. More specifically, the invention relates to a method for treating kaolin clay so that deflocculated concentrated aqueous slips of the clay have reduced viscosity.

One of the most important uses of kaolin clay, especially a minus 2 micron size fraction of the clay, is as the sole or principal pigment ingredient in a coating color. A coating color, which is a fluid aqueous composition, is applied to paper to produce a desirable white surface finish on the paper. The composition contains water, adhesive, clay and clay dispersant (deflocculant). Formerly, the speeds at which paper coating machines applied coating colors to the raw stock were rather low. Coating colors of fairly low clay solids content, e.g., 50 percent to 60 percent, sufficed. At the present, however, the paper coating industry employs very high machine speeds. In order to maintain adequate drying rates at these machine speeds, considerably more concentrated coating colors are required. To make up these coating colors, the clay must be made into highly concentrated deflocculated slips containing about 70 percent to 72 percent solids. These concentrated slips must be sufficiently fluid to be handled by pumps and must not require excessive power when agitated.

Paper coating grades of kaolin are supplied to the trade as "regular," "medium" or "low" viscosity clay, according to certain standards widely used in the industry. These standards are based upon the viscosity of clay slips of specified concentration (about 70 percent to 71 percent solids) with specified viscometers, such as the Hercules Hi-Shear viscometer. The Hercules viscometer is a rotational instrument which automatically traces a continuous plot of torque versus rate of shear over a rate of shear range of 0 to 4540 reciprocal seconds. The instrument is described in an article by J. W. Smith and P. D. Applegate, "The Hercules Hi-Shear Viscometer," Paper Trade Journal 126, No. 23, 60–66 (June 3, 1948). Since apparent viscosity is inversely proportional to rate of shear at a given shearing force (torque), a fluid of highest apparent viscosity is indicated by a rate of shear-stress curve with maximum shearing force at a maximum rate of shear.

High solids slips of a substantial percentage of the minus 2 micron content of the kaolins available for mining vary from being either slightly too viscous to being considerably too viscous when subjected to high shear rates employed in the pumps and mixers employed in present-day paper coating operations. Therefore, many available kaolin clays are totally unfit for use in the production of present-day paper coating colors. The reserves of domestic kaolins which can provide clay products meeting the specification for paper coating grades of kaolin have dwindled at an alarming rate. This is of great concern to clay producers and the paper coating industry. In efforts to cope with the problem, it has been the practice of the clay industry to mechanically work kaolin clays with a high energy input before using the clays for paper coating use. For example, for many years some of the kaolin clay supplied to the industry has been reduced in viscosity by forming a fluid slip of the clay and shearing the slip by passing it through a Morehouse mill, which is a type of mill featuring a stator and rotor closely spaced from the stator. U.S. 3,106,476 to Nathan Millman and James B. Whitley is another example of a disclosure of a process for reducing the viscosity of kaolin by working a fluid slip of the clay. Kaolin clay can also be reduced in viscosity by mechanically working plastic or semisolid clay-water systems in kneaders or puggers. This technique is described in U.S. 2,907,666 and U.S. 2,535,647, also to Nathan Millman and James B. Whitley.

An object of this invention is to improve the response of kaolin clay to viscosity reduction by mechanically working the clay with a high energy input.

An additional object is to prepare kaolin clay products having lower viscosity than kaolin clay products which have been processed for viscosity reduction by mechanical work alone.

Other objects and features will be apparent from the description of the invention which follows.

I have discovered that kaolin clays respond remarkably to viscosity improvement by mechanically working clay-water systems when the clay that is worked has previously been subjected to a specific treatment with hydrofluoric acid, as described hereinafter.

Stated briefly, in accordance with this invention, kaolin clay is processed for viscosity reduction by forming a fluid suspension of the clay in a very dilute aqueous solution of hydrofluoric acid, separating the clay from the liquid and washing the clay to remove free acid. Thereafter, the clay is mechanically worked in a clay-water system that is very concentrated when compared with the concentration of clay in the dilute hydrofluoric acid clay pretreating step.

Kaolin processed in accordance with the present invention has a lower high shear viscosity than the clay would have when mechanically worked with a high energy input without the dilute hydrofluoric acid pretreatment. This result is achieved, surprisingly, with certain high viscosity clays which are not reduced appreciably in viscosity by the hydrofluoric acid treatment per se. The treatment of kaolinite with the acid is disclosed and claimed in my copending application, Serial No. 313,742, now issued as U.S. 3,274,011.

From the brief description of my process, given hereinabove, it can be seen that a characteristic of the process is that the hydrofluoric acid treatment must precede the mechanical working step. Another characteristic is that the hydrofluoric acid treatment is carried out with very dilute clay-water systems (typically 20 percent to 30 percent solids). The subsequent working step, in contrast, is carried out with concentrated clay-water systems, for example, 60 percent to 80 percent solids, depending on the equipment and technique used. The desired results are not realized when the acid treatment is carried out with high solids clay-water systems. For example, it will not suffice to moisten the clay with the hydrofluoric acid solution and pug the mixture. Conversely, the desired results are not realized when the working step is carried out with very dilute clay-water systems. These factors contribute to the realization of an economically feasible process, since the clay at the termination of the viscosity improvement processing is in the high solids form required for commercial use or shipment.

In carrying out this invention, the clay employed can be primary or secondary clay. Raw kaolin clay which has been merely crushed, blunged and degritted can be employed. Refined clays, such as clays that has been fractionated and/or bleached, filtered and washed, can also be used. Flotation beneficiated clay is suitable. Predispersed clay, such as the commercial predispersed grades of coating clay, can be employed. A clay consisting predominantly of the clay mineral kaolinite must be employed. Substantially pure kaolinite, free from bentonite clay, is recommended since the presence of bentonite can have a markedly adverse effect on the product. The starting clay can be whole clay (which ususally has an average equivalent spherical diameter of about 0.8 to 2 microns) or it can be a fine-size fraction of whole clay, e.g., a clay having an average equivalent spherical diameter of 0.5 to 0.8 micron. A coarse size fraction of clay, such as a material having an average equivalent spherical diameter of 5 microns, can also be used. Preferably, the clay that is employed is unbleached clay since unbleached clay appears to be more responsive to the hydrofluoric acid treatment than bleached clay.

In putting the invention into practice, the clay is agitated in the dilute hydrofluoric acid solution at ambient temperature. The acid concentration is below 1 percent, typically 0.25 percent to 0.60 percent. The clay solids concentration is such that the mixture of finely divided clay and dilute acid is a thin, fluid slip or suspension. The clay solids of the suspension is within the range of 10 percent to 30 percent. At clay solids lower than 10 percent, an excessive amount of water must be removed from the clay. At clay solids above 30 percent, the slip may not be sufficiently fluid. For economic reasons, the use of slips of 20 percent to 30 percent clay solids is preferable. Under the conditions employed, the acid has a distinct dispersant effect and the slip is more fluid than it would be in the absence of the acid. This is a surprising effect since acids normally flocculate clays. The quantity of HF in the dilute acid solution is within the range of 5 to 40 pounds HF per ton of dry clay. With most clays, from 10 to 20 pounds of HF per ton of clay is suitable. When too little acid is used, the benefits may not be as significant as they would be if larger quantities were used. On the other hand, the use of excessive quantities of acid may result in undesirable chemical decomposition of the clay. The pH of the clay slip is usually within the range of about 1.5 to 2.5. In making up the dilute hydrofluoric acid, the presence of appreciable mineral matter, especially mineral matter that is a source of alkaline earth cations, may be detrimental because of the reaction between such cations and the acid.

The clay is agitated in the acid solution for at least 15 minutes, typically ½ hour to 1 hour. Longer agitation periods can be used. For economic reasons, however, excessive agitation is undesirable. The agitation is carried out without heating the clay-acid slurry. Since the clay solids content is low, the temperature of the slurry does not increase substantially while the slurry is agitated.

The acid-treated clay must be separated from the acid solution as by filtration, washed to eliminate free acid, and then concentrated for the working step. The slip can be flocced with mineral acid or sulfur dioxide to facilitate filtration. Any of the filters used by the clay industry can be employed. The filter cake is then washed with water. This is a suitable point in the process for chemically bleaching the clay. Hydrosulfurous bleaching reagents of the type usually used by the industry can be employed. After bleaching, the clay pulp is washed, thickened, and then mechanically worked with a high energy input.

The acid-treated clay can be worked by pugging, as described, for example, in U.S. 2,535,647 or U.S. 2,907,666, or by working a fluid slurry of the clay, as described, for example, in U.S. 3,106,476 (supra). As mentioned hereinabove, a characteristic of the working step is that the clay solids content of the clay-water system is substantially greater than the clay solids content was during the hydrofluoric acid treating step. Normally, the clay-water system increases in temperature during the working step. In fact, the temperature may rise to values at which the water has very high vapor pressure and considerable evaporation occurs. When working the clay in the form of a plastic or semisolid mass, the clay solids may be within the range of 77 percent to 85 percent. When working the clay in the form of a fluid suspension, clay solids of at least 60 percent and sometimes as high as about 77 percent are employed. In working fluid suspensions of the clay or when carrying out the process of U.S. 2,535,647, a clay dispersant is used. The preferred dispersants are alkali metal salts of condensed phosphates. The term "condensed phosphate" as used herein encompasses the phosphate salts described in Table I of Kirk-Othmer's Encyclopedia of Chemical Technology, vol. 10, page 404 (1953 edition). As described in this table, the condensed phosphates have a ratio (R) of cationic oxides (such as $Na_2O$ and including $H_2O$ of composition) to anionic oxides ($P_2O_5$) between 0 to 3 and encompass ultra-phosphates (R between 0 and 2); pyrophosphates (R is 2); and mixtures of pyro- or ortho-phosphates (R is between 2 and 3). Species include sodium hexameta-phosphate, sodium tripolyphosphate, tetrasodium pyrophosphate and sodium hexametaphosphate. The condensed phosphate can also be used as the potassium or ammonium salt. Mixtures of condensed phosphates can be employed.

It is preferable to work a dispersed fluid suspension of the clay at about 70 percent solids with an impeller agitated vessel such as a Cowles Dissolver of a Fagergren machine. An illustration of a Cowles Dissolver appears in a publication, "Improved Methods of Coating Preparation Using Morehouse Mills and Cowles Dissolvers," Technical Bulletin No. 36–1963, Morehouse-Cowles, Inc., 1150 San Fernando Road, Los Angeles, Calif. The Fagergren mixer, which is widely used in the ore flotation field, features a squirrel cage impeller mounted on a revolving vertical shaft. The squirrel cage impeller is enclosed about a fixed circular stator consisting of horizontal pins or cylinders mounted along the periphery between two circular horizontal plates.

The amount of work input expended on the clay-water system will depend on the viscosity of the starting clay, the desired viscosity of the worked clay, and the efficiency of the machinery used to work the clay. Since most coating operations require clay having a Hercules end point viscosity less than $16 \times 10^6$ dyne-cm. at 450 r.p.m. (71 percent solids dispersed slurry), the clay should normally be worked at least until such a viscosity is realized. In most cases, the clay should be worked until the viscosity is less than $10 \times 10^6$ dyne-cm. at 1100 r.p.m. The work expended on the clay-water system is usually within the range of 50 to 300 hp.-hr./ton of dry clay and, in most cases, is within the range of 100 to 200 hp.-hr./ton.

After the clay-water system has been mechanically worked with a high energy input, the clay-water system can be diluted, if necessary, to the 70 percent to 71 percent solids level present in fluid clay slurries intended for commercial shipment. Unless a clay dispersant was used in the working step, a dispersant must be added to prepare the high solids slurry. A condensed phosphate dispersant can be used in amount within the range of 0.1 percent to 0.5 percent of the clay weight. When a predispersed clay product is desired, the clay suspension is diluted, a dispersant added if necessary, and the suspension spray dried. An acid-clay product can be obtained by flocculating the suspension with acid or alum and filtering.

The present invention and its features and advantages will be understood more fully by the following illustrative examples.

In the examples, the viscosity of mechanically worked clays and control clays was determined by the following procedure, which is based upon the International Paper Company ("IP") test. Five hundred (500) grams of clay slurry at 71 percent solids (70.95 percent to 71.15 percent) was made up as follows. The free moisture content of the clay was measured with a Cenco Moisture Balance. (Free moisture, as determined by this method, corresponds substantially to the weight percent of the clay that is eliminated when the clay is heated to essentially constant weight at 220° F.) Three hundred and fifty-five (355) grams of the clay, on a moisture-free clay weight basis, were weighed out with 0.1 gram accuracy. Distilled water was weighed out to 0.1 gram accuracy, in amount to produce 71 percent solids. The water was weighed out in a wide mouth glass pint jar. Pulverized tetrasodium pyrophosphate was added to the water in amount of 0.2 percent, based on the moisture-free clay weight while the water was stirred with a propellor-type stirrer (Drill Press) at 1000 r.p.m. The tetrasodium pyrophosphate was weighed to 0.001 gram accuracy. The clay was added to the water while stirring at 1000 r.p.m. for about 5 minutes and the jar was then stirred for 30 minutes at 1000 r.p.m. The jar was sealed with a screw cap. Three to five grams of the slurry was then removed for clay solids determination. The clay solids was accurately determined by weighing the sample that was removed to 0.001 gram accuracy in a flat dish and then heating the open dish at 220° F. for 30 minutes. If the clay solids were not within the 70.95 percent to 71.15 percent range, the required amount of distilled water was added from a 10 cc. burette to 0.1 cc. accuracy.

Viscosity determinations were made with the Hercules viscometer as follows. Using the "B" bob, the Hercules instrument was run approximately 30 seconds up and 10 seconds down at 80° F. The Hercules end point was then run and recorded on the chart. Tetrasodium pyrophosphate was weighed out to the nearest 0.001 gram and added in amount of 0.05 percent of the moisture-free clay weight. The contents were stirred for 5 minutes and the pH and Hercules end point determined. Tetrasodium pyrophosphate was then added in increments of 0.05 percent, based on the dry clay weight. This was followed by stirring and making Hercules end point evaluations, until the highest r.p.m. at $16 \times 10^5$ dyne.-cm. or the lowest dyne.-cm. $\times 10^5$ at 1100 r.p.m. was reached. This was the "Hercules end point" value.

EXAMPLE I

*Processing "high" viscosity kaolin.*—The clay used in the test was a high viscosity, high purity white kaolinite from a mine near McIntyre, Ga. An analysis of typical samples of the crude after blunging, degritting and bleaching is as follows:

| | Weight percent (moisture-free basis) |
|---|---|
| Silicon ($SiO_2$) | 45.4 |
| Aluminum ($Al_2O_3$) | 38.8 |
| Iron ($Fe_2O_3$) | 0.3 |
| Titanium ($TiO_2$) | 1.5 |
| Calcium (CaO) | 0.1 |
| Sodium ($Na_2O$) | 0.1 |
| Potassium ($K_2O$) | Trace |
| Loss on Ignition | 13.8 |
| | 100.0 |

Seven thousand one hundred and forty-three (7143) grams of the high viscosity kaolin crude at 84.0 percent solids (6000 grams of dry clay) was pulped with distilled water at 40 percent clay solids and agitated for 10 minutes with a slow speed Lightnin' Mixer. Three hundred and sixty (360) ml. of a 5 percent solution of sodium silicate ("O" brand having a $Na_2O/SiO_2$ mol ratio of 1:3.22) was added and agitated for 30 minutes. The dispersed slip was degritted by allowing the slip to settle for 5 minutes and decanting the dispersed clay from the sediment. The degritted slip was fractionated on a Tolhurst centrifuge to 82 percent to 90 percent minus 2 microns (equivalent spherical diameter). The fractionated dispersed slip contained 25.1 percent clay solids (25.1 percent by weight moisture-free clay and 74.9 percent water).

*Hydrofluoric acid and mechanical work.*—In accordance with this invention, 3984 grams of the dispersed degritted slip was bleached with zinc hydrosulfite in amount of 7.0 pounds per ton of clay, filtered, washed with distilled water, dried and pulverized. Ten grams of a 48 percent aqueous solution of hydrofluoric acid was added to the clay slip which contained 1000 grams of dry clay. The slip was agitated in the dilute acid for an hour at ambient temperature (around 80° F.). The sample was filtered and rinsed once with distilled water, using one part by weight clay to one part by weight water. The washed clay was oven dried and pulverized.

Six hundred (600) grams of the washed clay was mixed with 245 ml. of distilled water and 2.4 grams tetrasodium pyrophosphate. The slip was agitated in a closed Waring Blendor for an hour. At the end of an hour, the clay solids was 72.4 percent as a result of evaporation. The slip was diluted to 71.0 percent solids and the Hercules end point viscosity was determined.

For comparative purposes the following tests were performed.

*Control.*—In a control test, a sample of the dispersed degritted slip was bleached at a pH of 2.0 with zinc hydrosulfite (7.0 pounds reagent per ton of clay). The bleached clay was filtered and the filter cake rinsed once with an equal weight of water, dried and pulverized. Without being treated with hydrofluoric acid, the clay was then made up into a 71.0 percent solids slip and the Hercules end point viscosity determined.

*Hydrofluoric acid treatment alone.*—To 3984 grams of the dispersed degritted slip containing 1000 grams clay, 10 grams of 48 percent aqueous solution of hydrofluoric acid was added and agitated for an hour. The pH of the slip was 2.0. The slip was then bleached with 7.0 pounds per ton zinc hydrosulfite, filtered, rinsed once with an equal weight of distilled water, dried and pulverized. A 71.0 percent solids slip was prepared and viscosity evaluations made.

*Mechanical working alone.*—A 500 gram sample of the degritted dispersed slip was bleached with 7.0 pounds per ton zinc hydrosulfite, filtered, rinsed once with an equal weight of distilled water, oven dried and pulverized. Six hundred (600) grams of the clay was agitated with 245 ml. of distilled water and 2.4 grams tetrasodium pyrophosphate. Five hundred (500) grams of the dispersion at 71.0 percent solids was placed in a Waring Blendor which was covered. The charge in the Waring Blendor was agitated for an hour without heating the contents. The sample was then adjusted to 71.0 percent solids and viscosity measurements were made.

The results of these tests are summarized in Table I.

TABLE I.—EFFECT OF HYDROFLUORIC ACID PRETREATMENT ON THE REDUCTION IN VISCOSITY OF MECHANICALLY WORKED HIGH VISCOSITY KAOLINITE

| Clay Processing: | Viscosity (Hercules end point) r.p.m. at $16 \times 10^5$ dyne-cm. |
|---|---|
| Control kaolinite | 280 |
| HF pretreated kaolinite, unworked | 335 |
| Worked kaolinite without HF pretreatment | 610 |
| Worked HF pretreated kaolinite | 845 |

The data in Table I show clearly that when the clay was treated with dilute hydrofluoric acid before the mechanical working step, in accordance with my invention, the viscosity of the worked clay was appreciably less than when the clay was worked without the hydrofluoric acid pretreatment.

EXAMPLE II

*Processing "medium" viscosity kaolin.*—The following illustrates the operation of my process with a medium viscosity clay from a mine near McIntyre, Ga. This clay was also a high purity fine-size fraction of kaolinite and was similar in chemical composition to the clay of Example I.

Seven thousand and fifty-eight (7058) grams of the crude at 85.0 percent solids (6000 grams dry clay) was agitated for 30 minutes with 360 ml. of a 5 percent solution of "O" brand sodium silicate. The dispersed slip was degritted by settling for 5 minutes and decanting. The slip was then fractionated in a Tolhurst centrifuge to obtain a cut containing 82 percent to 90 percent by weight of particles minus 2 microns in equivalent spherical diameter. The slip contained 25.6 percent clay solids.

*Control.*—In a control test, 3906 grams of the fractionated dispersed slip containing 100 grams dry clay was bleached with 7.0 pounds per ton zinc hydrosulfite at a pH of 1.8, filtered, rinsed once with distilled water, dried, pulverized and tested for viscosity.

*Hydrofluoric acid treatment.*—Portions of the fractionated dispersed slip were treated with various quantities of dilute hydrofluoric acid as follows:

Three thousand nine hundred and six (3906) grams of the slip at 25.6 percent solids (1000 grams clay) was treated with 4.8 pounds HF per ton of clay by adding 5 grams of hydrofluoric acid as a 48 percent aqueous solution. The suspension, which had a pH of 2.4, was agitated for an hour, bleached with 7.0 pounds per ton zinc hydrosulfite (pH 1.5), rinsed and dried. The procedure was repeated wtih sufficient quantities of the hydrofluoric acid to provide 10 grams and 20 grams HF per 1000 grams clay. (9.6 and 19.6 pounds HF per ton of clay.) The viscosities of 71.0 percent solids dispersed slips of the processed clays were evaluated.

*High solids mechanical work.*—Three thousand eight hundred and twenty-one (3821) grams of a fractionated dispersed slip of the clay solids was bleached with 7.0 pounds per ton zinc hydrosulfite, filtered, rinsed once with distilled water using equal weights of water and clay filter cake, oven dried and pulverized. A 71.0 percent solids slip of the clay was prepared with distilled water and tetrasodium pyrophosphate in amount of 0.40 percent of the clay weight. Five hundred (500) grams of the slip was mechanically worked in a closed Waring Blendor for an hour. The solids content of the slurry of worked acid-treated clay was adjusted from 71.4 percent to 71.0 percent by addition of water and the viscosity tested.

*Hydrofluoric acid treatment and mechanical working.* —Samples of each of the hydrofluoric acid-treated clays were made down into 71.0 percent solids dispersions with 0.4 percent tetrasodium pyrophosphate (based on the clay weight) and the dispersions were separately agitated in a closed Waring Blendor for 10 minutes. Solids of the worked slurries were adjusted to 71.0 percent by addition of water and viscosity evaluations were made.

The results are summarized in Table II.

TABLE II.—EFFECT OF HYDROFLUORIC ACID PRETREATMENT ON THE REDUCTION IN VISCOSITY OF MECHANICALLY WORKED MEDIUM VISCOSITY KAOLINITE

| HF/Ton Clay | Mechanical Work | Viscosity (Hercules end point, r.p.m. at dyne-cm.×10⁵) |
| --- | --- | --- |
| None | None | 700/16 |
| 4.8 | do | 705/16 |
| 9.6 | do | 750/16 |
| 14.4 | do | 750/16 |
| 19.2 | do | 820/16 |
| None | 10 minutes | 610/16 |
| 4.8 | do | 1100/11 |
| 9.6 | do | 1100/11 |
| 19.2 | do | 1100/11 |

The results of the tests summarized in Table II show that the use of dilute hydrofluoric acid solution in amounts from 9.6 to 19.2 pounds HF per ton clay decreased the clay viscosity slightly. With this particular clay, mechanically working a fluid slip of the clay for 10 minutes increased viscosity slightly. However, when the clay was treated with from 4.8 to 19.2 pounds HF per ton of clay and then worked, in accordance with this invention, the clay viscosity was reduced substantially.

All concentration of solutions mentioned herein are reported on a weight basis.

I claim:
1. In a method for reducing the viscosity of kaolin clay by subjecting a fluid clay-water system containing 60 to 77 percent clay solids to mechanical work with a high energy input,
   the improvement which comprises pretreating said kaolin clay by forming it into a fluid slip containing water, 10 to 30 percent by weight clay solids and about 5 to 40 lbs. HF per ton of said clay, agitating said slip, separating said clay from the aqueous phase and washing said clay to eliminate free acid.
2. The method of claim 1 wherein hydrofluoric acid in said slip has a concentration below 1 percent.
3. The method of claim 1 wherein said slip containing hydrofluoric acid is agitated at ambient temperature, filtered and the kaolin clay washed to removed free acid.
4. The method of claim 1 in which said clay is bleached with a hydrosulfurous bleaching agent after being agitated with said water containing hydrofluoric acid and before being subjected to said mechanical work.
5. The method of claim 1 wherein said kaolin clay that is agitated with said solution of hydrofluoric acid is a fine-size fraction of clay.
6. The acid-treated, mechanically worked clay product of claim 1.
7. A fluid aqueous clay slurry consisting essentially of water, from 70 to 72 percent of the acid-treated, mechanically worked clay product of claim 6 and a condensed phosphate in dispersant-effective quantity.
8. The method of claim 1 wherein said clay is mechanically worked in the form of a dispersed fluid suspension containing a sodium condensed phosphate dispersing agent.
9. The method of claim 1 wherein said slip contains from 10 to 20 lbs. of hydrofluoric acid per ton of clay.
10. In a method for reducing the viscosity of kaolin clay by subjecting a plastic clay-water system containing 77 to 85 percent clay solids to mechanical work with a high energy input,
    the improvement which comprises pretreating said kaolin clay by forming it into a fluid slip containing water, 10 to 30 percent by weight clay solids and about 5 to 40 lbs. HF per ton of said clay, agitating said slip, separating said clay from the aqueous phase and washing said clay to eliminate free acid.

References Cited

UNITED STATES PATENTS

| 2,440,601 | 4/1948 | Dickerman | 106—288 |
| 3,106,476 | 10/1963 | Millman et al. | 106—72 |
| 3,274,011 | 9/1966 | Duke | 106—72 |

FOREIGN PATENTS 272,976   6/1927   Great Britain.

TOBIAS E. LEVOW, *Primary Examiner.*

J. E. POER, *Assistant Examiner.*